United States Patent
Hong

[11] Patent Number: 6,019,554
[45] Date of Patent: Feb. 1, 2000

[54] METHOD AND SYSTEM FOR COMPUTER ASSISTED MANUAL MACHINE TOOL CONTROL

[76] Inventor: Jiawei Hong, 636 Broadway, Room 714, New York, N.Y. 10012

[21] Appl. No.: 09/182,271

[22] Filed: Oct. 29, 1998

Related U.S. Application Data

[60] Provisional application No. 60/063,812, Oct. 31, 1997.

[51] Int. Cl.$^7$ ........................................ B23C 1/06
[52] U.S. Cl. ..................... 409/132; 364/474.19; 409/80; 409/84; 408/3
[58] Field of Search ................................ 409/79, 80, 84, 409/131, 132, 134; 408/3, 13; 364/474.02, 474.17, 474.19

[56] References Cited

U.S. PATENT DOCUMENTS

| | | | |
|---|---|---|---|
| 2,832,023 | 4/1958 | Gough | 409/80 |
| 2,969,490 | 1/1961 | Anderson et al. | 409/79 |
| 3,420,347 | 1/1969 | Bales | 408/3 |
| 3,557,642 | 1/1971 | Schmidt | 408/3 |
| 3,559,510 | 2/1971 | Blackburn | 408/3 |
| 3,636,814 | 1/1972 | Esch | 409/84 |
| 3,711,212 | 1/1973 | Kuck | 408/3 |
| 4,674,928 | 6/1987 | Lyman | 409/80 |
| 5,330,298 | 7/1994 | Welch et al. | 409/80 |
| 5,538,372 | 7/1996 | Cuneo et al. | 408/3 |

*Primary Examiner*—Daniel W. Howell
*Attorney, Agent, or Firm*—Eliot S. Gerber

[57] ABSTRACT

A computer assisted manual machine tool system and method for milling, turning and grinding uses a computer model of machine objectives and location feedback signals from the tool to control motion switch means enabling and disabling tool motion. The manual machinist may position a tool to a target position by enabling motion along each controlled axis while the tool's position feedback for that axis is outside of the tolerance specification and disabling motion once the tool is within that tolerance. The machinist may contour within a specified tolerance zone by toggling the motion switch means for each axis to produce motion along that contour. The machinist may pocket by enabling motion while the tool is away from the pocket surfaces and disabling motion when the tool position is within a predetermined distance of any pocket surface.

24 Claims, 9 Drawing Sheets

METHOD AND SYSTEM FOR COMPUTER ASSISTED MANUAL MACHINE TOOL CONTROL

RELATED APPLICATION

This application is based on Provisional Application No. 60/063,812, filed Oct. 31, 1997.

FIELD OF TECHNOLOGY

This invention relates to machine tools and more specifically to an improved method and system for manufacturing workpieces utilizing manual relative tool motion.

BACKGROUND AND PRIOR ART

Machine tools using manual positioning such as milling machines (knee mill, bed mill, gantry mill, horizontal mill), laths and grinders are ubiquitous in the manufacture of workpieces (mechanical components). These machines incorporate manually operated hand wheels or levers producing axial motion controlled by the machinist. Frequently, a machine tool screw to which a hand wheel is fixed converts the rotary motion of the hand wheel to linear motion. The magnitude of this rotary hand motion may be determined by examining the dial associated with each hand wheel. Using such a system the machinist remains in complete control of the cutting and shaping process. The terms "relative tool motion" and "positioning the tool" refer to relative movement between the tool, i.e., the cutter and the workpiece. Such relative tool motion may be obtained by moving the tool in three directions (x,y,z) relative to a fixed workpiece, moving a table having the workpiece fixed thereto in the x and y directions and the tool in the Z direction, or other movements of the tool and/or workpiece. For example, the machinist may move a table in the x and y directions and the motor rotated cutting tool in the z direction, each direction of movement being controlled by a separate hand wheel. The accuracy, precision and speed necessary to machine a component (workpiece) is a reflection of the machinist's skill.

Despite the flexibility and ease of use by such manually controlled machine tools, several limitations exist. The burden of precisely positioning the tool falls on the machinist, who may, with a single lapse in concentration position the tool to an unintended place or beyond a part boundary, irrevocably damaging the component. Furthermore, coordinated multiaxis motion produced by simultaneously turning two hand wheels cannot be reliably or accurately reproduced limiting the manual machining process to movement along a single axis followed by movement along a different axis.

The use of a digital readout (DRO) device in conjunction with this type of manual machine tool is intended to assist the machinist in positioning the tool. A DRO utilizes a position feedback sensor, such as an encoder, linear scale or other position transducer to directly report the current position of the tool with respect to a predefined coordinate frame. The tool's position is shown on a digital display. Some DROs support advanced position displays with features like multiple coordinate systems, "distance to travel" displays and way points. DROs, however, do not prevent unintended positioning errors or excessive travel errors by the machinist, nor do they assist the machinist in performing multiaxis coordinated moves.

A computer numerically controlled (CNC) machine tool utilizes computer controlled motors in addition to the position feedback signals to precisely machine components. They may machine components using simultaneous multi-axis coordinated motion. Once the part program (computer software) is prepared these CNC machines can run unattended. However, compared to manual machine tools, CNC systems are expensive and require considerable training before an operator can program and use them. Thus, CNCs are not always economical, particularly when small batches of simple components are to be machined and it may not be economical for a small machine shop to purchase a CNC.

Accordingly, it is an object of this invention to provide improved methods and systems assisting machinists in positioning a tool on manual controlled machines where it is desirable to move the tool to a target position within a known tolerance.

It is also an object of this invention to provide improved methods and systems for assisting manual machines in moving the tool along a known path within a predetermined tolerance zone during contouring operations, even if the path contains complex coordinated multiaxis motions.

It is a further object of this invention to assist manual machinists with pocketing operations on a workpiece by preventing motion that would violate any of the boundary surface constraints defining the pocket.

It is a further object of this invention to allow for the quick, consistent, precise and accurate machining of mechanical components regardless of a machinist's skill level or experience and without a CNC system.

SUMMARY OF INVENTION

This invention improves manual machining systems and methods by creating a new class of machine tools, incorporating a manual machine's flexibility with the accuracy, precision and multiaxis coordinated control of a CNC machine tool. A "manual machine tool" is one in which relative tool motion is obtained by hand control, for example, in a knee mill the table holding the workpiece is manually positioned, the tool (cutter) is motor-driven and the tool may be vertically manually positioned. It is an economical package that can be either fitted onto a new manual machine tool or retrofitted onto exiting manual machine tools. As a result of the present invention, components previously manufactured using manual machine tools can be produced with higher accuracy, repeatability and speed regardless of the machinist's skill or experience. Furthermore, components containing complex contours, which could not be produced using manual machine tools, are now realizable. This invention introduces a new class of machine tool controllers performing calculations and issuing control signals to motion switch means. A "motion switch means" controls mechanical motion, by switching motion on ("enabling") or switching motion off ("disabling") and generally includes an electromechanical transducer. The motion switch means may be an electrical clutch or an electrical brake. The control signals enable and disable relative tool motion. The control signals are derived from a machining objective (loaded into the controller) and from feedback signals for the tool's position on each axis.

The machining objective loaded into the controller identifies the current operation as a positioning, contouring or pocketing operation. The machining constraints associated with the current objective are also loaded into the controller. These constraints may differ for each objective, as will be explained shortly. Position transducers (sensors) mounted on the machine tool issue position feedback signals which indicate their positions. Relative movement between the tool cutter and the workpiece is realized through the machinist's manipulation of hand wheels, cranks or levers only when the computer controlled motion switch means is signaled to enable motion. The computer system (controller) monitors the tool position (by feedback) and issues control signals to a motion switch means (for each axis) enabling or disabling motion for each controlled axis. The motion switch means includes those utilizing braking forces, i.e., an electromechanical brake, to prevent further motion of the hand wheels or clutch-like devices, i.e., electromechanical clutch, engaging and releasing a coupling between the hand wheel and the machine screw. Complex motion switch means using differing gear ratios, and variable braking forces are within this invention as is the use of motors and engines actuating or stopping tool movement along the controlled axes. However, the cost benefits of this invention are most apparent with simple motion switch means and hand-operated control wheels.

When a positioning operation of the tool is desired, the machinist enters a position constraint and tolerance constraint for each controlled axis collectively defining a target region. These constraints are used to issue control signals to the motion switch means based on the position feedback signals for each axis as transmitted by the position transducers.

For contouring operations a path constraint and a tolerance are specified by the machinist. This path may be in the form of a line/arc definition of the desired trajectory, a mathematical function or any other format that lends itself to manipulation by a computer. The tolerance value, identifying the locus of points which are within a known distance from the path movement, is used to establish the tolerance zone in which the tool motion is permitted. This information along with the position feedback signals is used, in part, to issue control signals to the motion switch means.

Pocketing operations require the machinist to define boundary surface constraints and may include a tolerance or roughing distance. The "boundary surface constraints" define surfaces with which the tool is not permitted to come into contact and the "roughing distance" defines how close to the boundary surface constraints the tool is permitted to be moved. These constraints and the position feedback signals are used, in part, to issue control signals to the motion switch means, enabling and disabling the relative motion of the tool.

This invention can be best understood and implemented by those skilled in the art by referring to the figures and the description of the preferred embodiment which follow.

DETAILED DESCRIPTION OF THE PREFERRED EMBODIMENT

A preferred embodiment of the present invention is detailed using a manually operated 3-axis bed mill. Other types of mills or manufacturing equipment such as lathes or grinders may also be employed. Anyone skilled in the art of machine tool control would be able to apply this invention to other types of manual machine tools.

Figure 1:
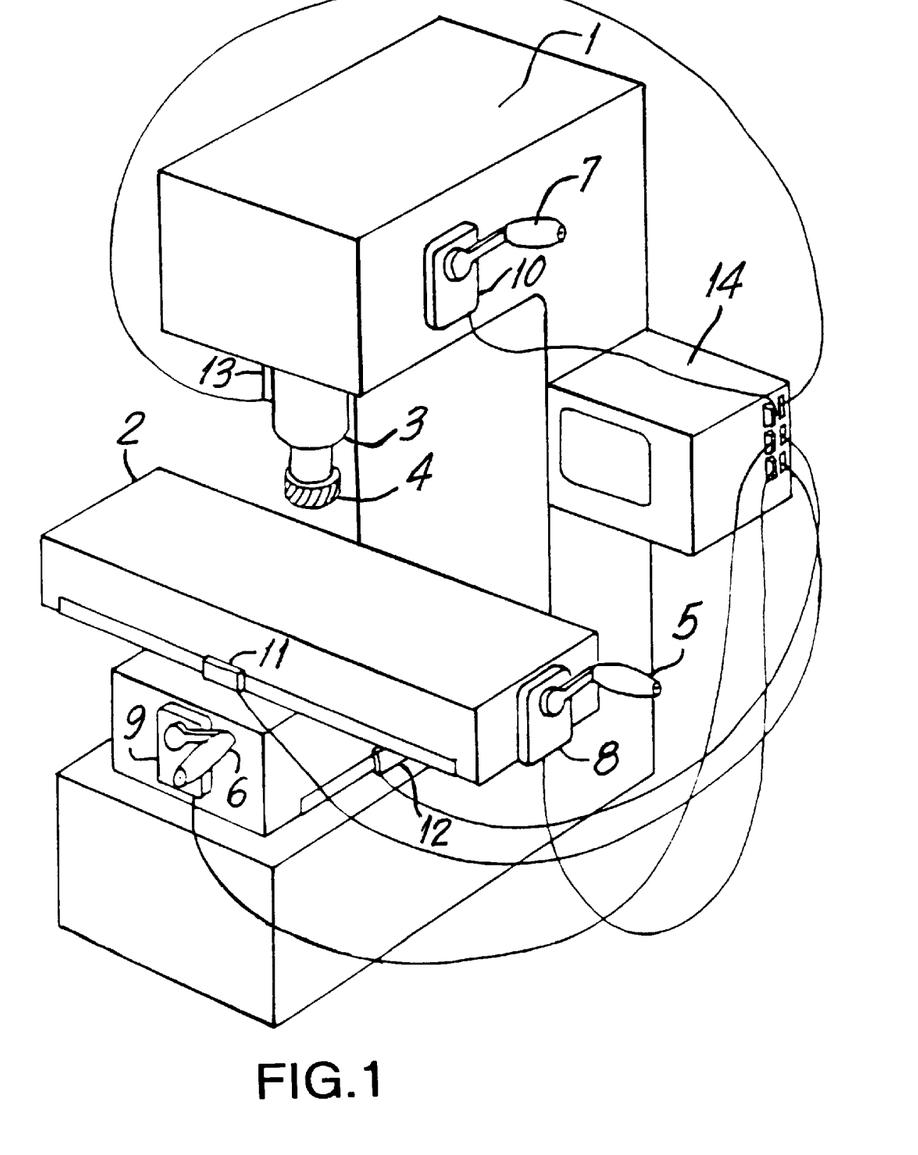
FIG. 1 shows a schematic representation of a computer assisted manual machine tool.

FIG. 1 is a schematic representation of a manual machine tool fitted with computer controlled hardware. The manual milling machine 1 has three manually operated orthogonal axes identified as X, Y and Z corresponding to the three Cartesan coordinates. The table 2, on to which the workpiece is fixed, produces planer XY motion and is moved relative to a quill 3, which supports the tool 4 (milling head). The quill 3 is capable of Z axis motion. The machinist can effect relative motion between the tool 4 and the table 2 along the X axis by moving the X hand wheel 5 while the X motion switch means 8 is signaled by the controller 14 to enable X axis motion. Likewise, relative motion along the Y axis is effected by turning the Y hand wheel 6 while the Y motion switch means 9 is signaled to enable Y axis motion by the controller 14. Z axis motion is realized by manipulating the Z hand wheel 7 while the Z motion switch means 10 is signaled to enable Z axis motion by the controller 14. Had the controller 14 signaled a motion switch means to disable motion, further motion along the corresponding axis would not be permitted.

Position feedback for the X, Y and Z axes is obtained from the signals generated by the X linear encoder 11, the Y linear encoder 12 and the Z linear encoder 13 respectively. The position feedback for the X, Y and Z axes are representative of the tool position in an orthogonal Cartesian coordinate system. Rotary encoders or other types of position transducers may also be used in place of the linear encoders which are shown. Anyone skilled in the art would understand how these devices could be substituted for those shown in the preferred embodiment and therefore their detailed description has been omitted.

The signals generated by the encoders are sent to the controller 14 containing the appropriate computer hardware and software to decode these signals; such as a 5-axis servo transducer PCB assembly (No.415-0622-001) from Hurco Companies, Inc. of Indianapolis, Indiana. The controller also contains the appropriate computer hardware such as CYDIO24 TTL-Level Digital I/O board used to drive CYSSR 08 Relay Mounting Rack housing WR ODC53-60V DC-3A relays available from Cyber Research, Inc. of Branford, Conn., for issuing control signals to the motion switch means. The controller itself is a general purpose computer such as a 486-DX2 66 computer available from many manufacturers including Advantech America of Sunnyvale, Calif. (AWS-860 Industrial Workstation with 10" Color CRT Display containing the PCA-667486 CPU Card with Cache), running the Windows® 95 operating system and supporting a keypad for input from the machinist and a display for visual output to the machinist. The integration of these computer components is common to the industry and therefore the detailed description specifying their integration is omitted.

Figure 2:
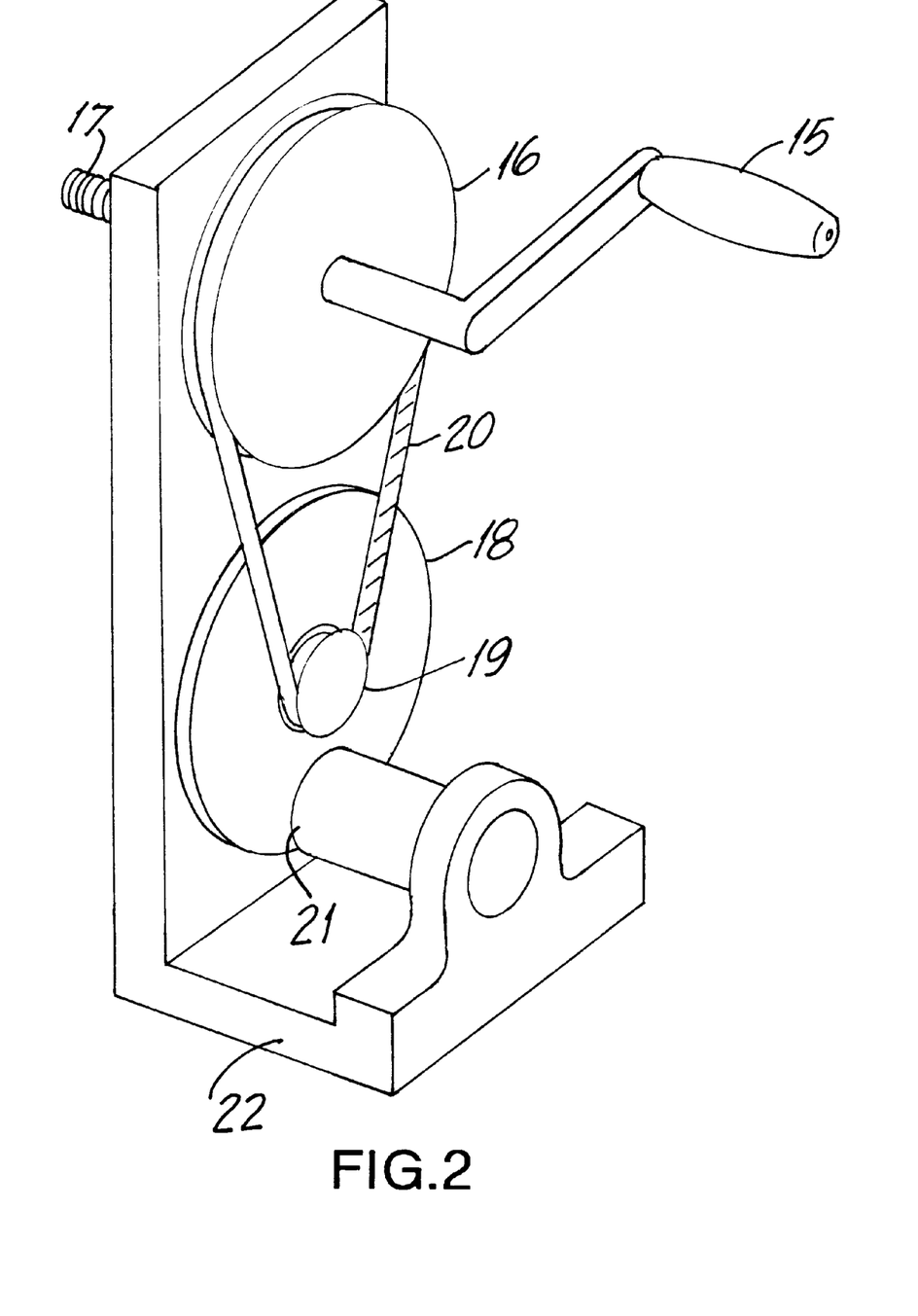
FIG. 2 is a schematic diagram of a motion switch mechanism employing a braking force to control the relative motion of the tool.

FIG. 2 illustrates one embodiment of a motion switch means utilizing a braking force (brake) to prevent further motion of the hand wheel when the controller signals the electromechanical brake that the motion of that axis is to be disabled. Such a brake may be employed as the motion switch means 8, 9 or 10 on any of the manually operated axes (X, Y or Z) depicted in FIG. 1. A hand wheel 15 is attached to a timing pulley 16 which is concentrically mounted to the machine tool screw 17. When the machinist turns the hand wheel 15 connected to the machine tool screw 17, the tool moves along the axis associated with that hand wheel. The direction of tool motion is determined by the direction in which the hand wheel is turned. A braking wheel 18 is mounted in a parallel shaft configuration. In this preferred embodiment a surface of the braking wheel 18 is magnetic and may be attracted by an electric magnet 21. Mounted concentrically onto the breaking wheel 18 is a second timing pulley 19, which is preferably smaller than pulley 16 to provide for mechanical advantage in stopping the motion of the hand wheel 15. A timing belt 20 connects the two pulleys so that movement of the hand wheel 15 produces motion of both pulleys, the machine screw 17 and the braking wheel 18. An electric magnet 21 is mounted in the assembly 22 housing the motion switch means so that the surface of the braking wheel 18 and the face of the electric magnet 21 are in contact. If the electric magnet 21 is off, the face of the braking wheel 18 is free to slide past the magnet 21 with a negligible amount of friction, enabling motion of the tool relative to the workpiece. When the electric magnet 21 is on, the magnetic field generated prevents the braking wheel 18 from sliding past the magnet 21 due to increased friction, thus disabling motion along that axis. An appropriate electronic relay may be employed to change the state of the magnet 21 under computer control.

Figure 3:
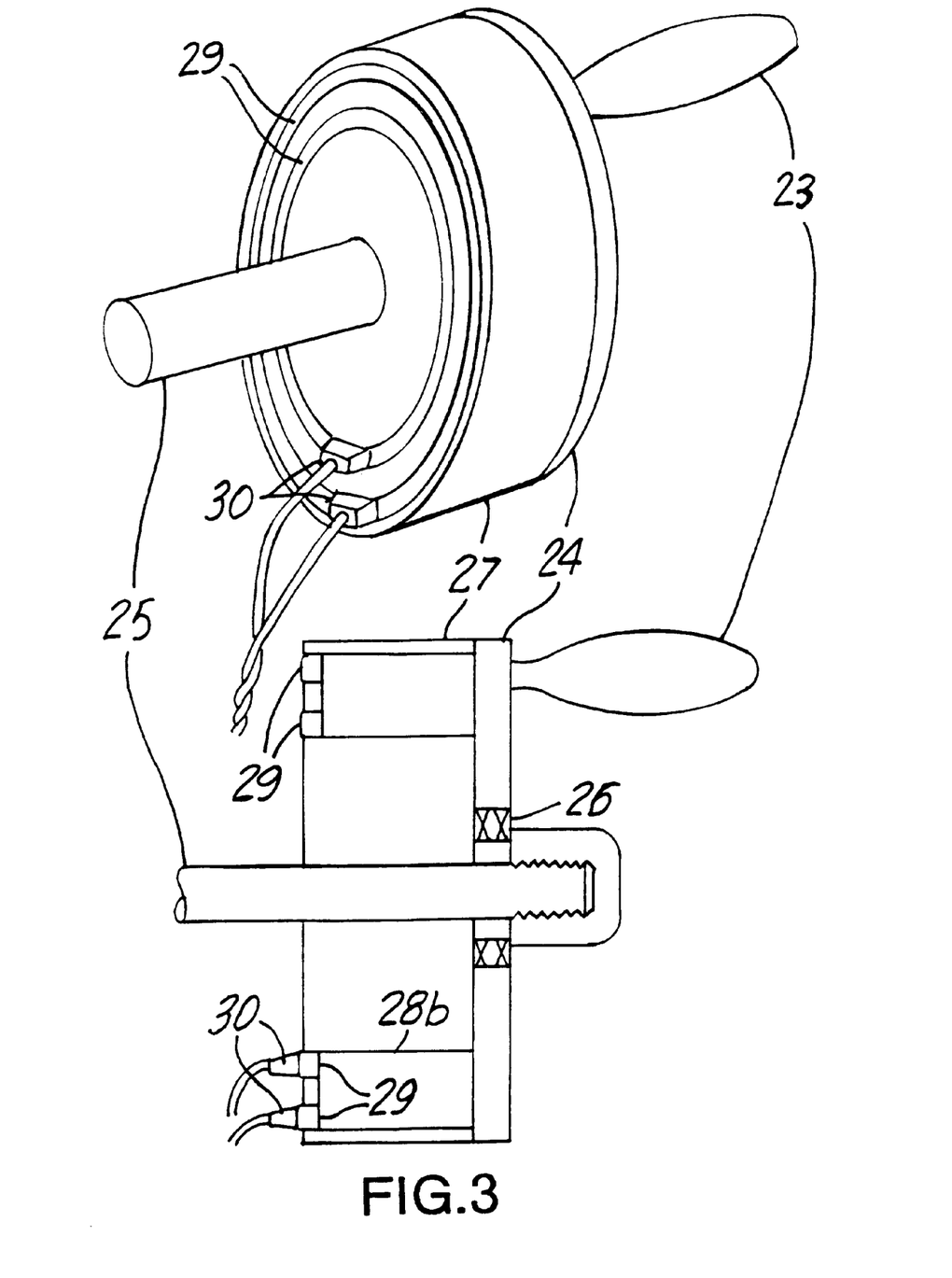
FIG. 3 is a schematic diagram of a motion switch mechanism employing a coupling to control the relative motion of the tool.

FIG. 3 illustrates an alternate design for a motion switch means using magnetic coupling, e.g., an electromagnetic clutch, to enable and disable motion. Such device may be mounted on any of the manually operated axes, as motion switch means 8, 9 or 10, as shown in FIG. 1. Hand wheel 23, connected to input plate 24, is free to rotate around machine tool screw 25 on the rotary bearing 26. The output plate 27 is mounted to the machine tool screw 25 so that they rotate in unison. Electromagnets 28a and 28b are mounted along the outer edge of the output plate 27 and receive power along the power bus 29 via the contact brushes 30. When the clutch is engaged current is supplied through the contact brushes 30 along the power bus 29 and activates the magnetic field produced by the electronic magnets 28a–28b. This in turn causes the input plate 24, which is attracted to the magnetic field, to magnetically couple itself with the output plate 27 enabling motion along the axis to which it is connected. If relative tool motion for a given axis is no longer desired, the current is stopped and further motion of the hand wheel by the machinist results in no additional motion of the machine tool screw 25. An appropriate electronic relay may be employed to change the state of the electronic magnets 28a and 28b under computer control.

Electronic clutches, i.e., electromechanical clutches useful in the construction of a motion switch means, may be purchased from numerous companies such as Warner Electric of South Beloit, Ill., which offers a 24-volt clutch with anti-backlash armature, part number SF-170. They also offer relays and a power supply for use with these products as well as various types of magnetic brakes, all of which may be incorporated by those skilled in the art of design into the design of a motion switch means such as those described above.

For this and all other illustrative examples it is assumed that three axes associated with the mill of FIG. 1 are under computer control but fewer or more axes may be supported using the sample principles.

Figure 9:
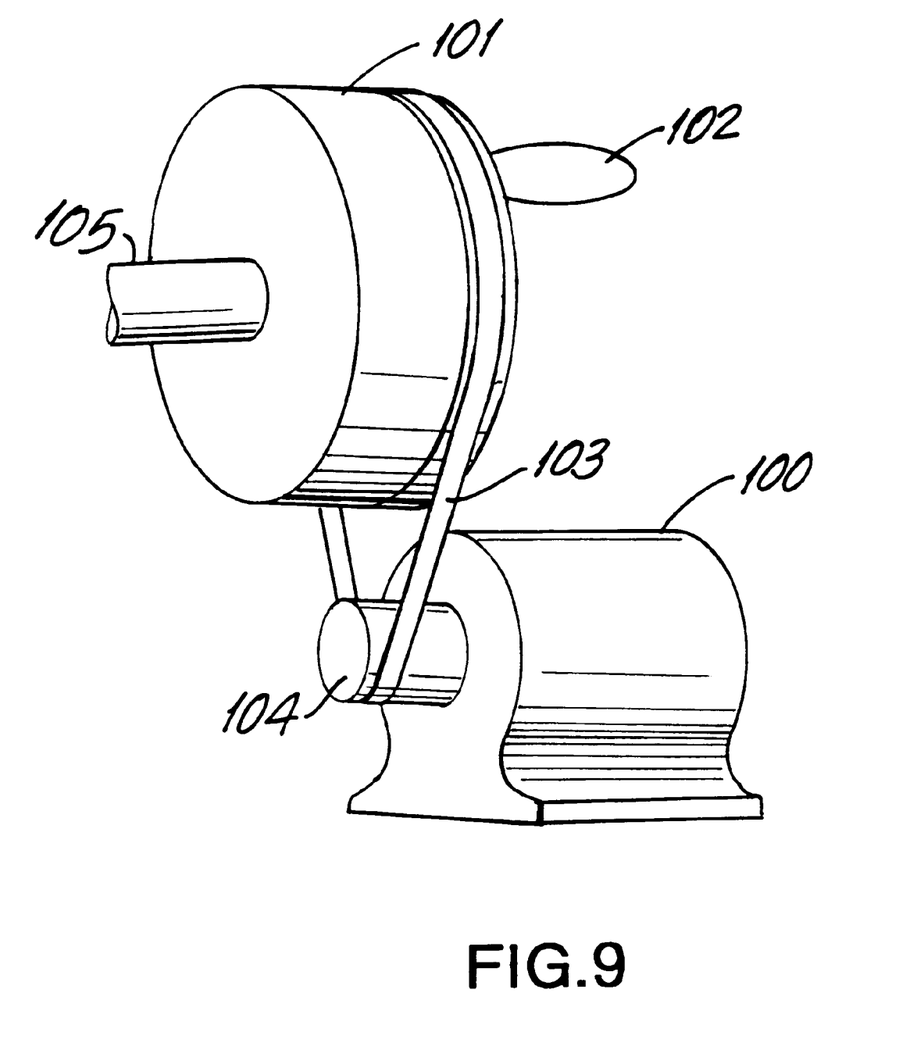
FIG. 9 is a perspective view of a motor connected to a hand wheel.

In the embodiments of FIGS. 1–3 a hand wheel is used as the moving means to move the tool along an axis. Alternatively, as shown in FIG. 9, a motor, preferably a D.C. motor, may be used as the moving means. The motor is controlled by the controller to move the tool to the positioning objective. The exact positioning of the tool is accomplished by the motion switch means, i.e., the electromechanical brake or electromechanical clutch. As shown in FIG. 9, a motor 100 turns the hand wheel 102, either replacing or aiding manual turning of the hand wheel 102. A belt 103 couples the shaft 104 of motor 100 to the hand wheel pulley 101. The hand wheel pulley 101 drives the screw shaft 105 which moves the tool along an axis.

Other couplings, such as timing belts and gear trains, may also be used. Devices used to turn the hand wheels of a manual machine tool are commonly referred to as power feed units. Companies such as Servo Products Company of Pasadena, Calif., offer a unit, the "Servo Turbo Drive", which is representative of a power feed device. These devices may be used with either of the motion switch means mechanism detailed in this application. Integrating such a drive unit is easiest with a motion switch means device employing a clutch mechanism. Once the clutch has been disabled, releasing the coupling between the hand wheel 102 and the machine screw 105, the motor may continue to rotate until the operator stops it. If a brake-type motion switch means device is used, then the braking force would have to be sufficient to overcome the torque on the motor (in the schematic shown this could be achieved by slippage of the belt 103), or the coupling between the motor 100 and the hand wheel 102 could be disengaged or the motor could be stopped. Many power feed units are intelligent devices designed to be controlled by electrical signals from external devices such as computers. Intelligent power feed units often include features supporting the remote selection of the rotating direction and speed in addition to the ability to turn the units on and off. Alternately, relays may also be used to enable the brake and disable the motor 100 simultaneously. Implementing any of these configurations would be obvious to anyone skilled in the art of motor control or programmable logic controller design, and therefore the detailed description of this has been omitted.

Figure 4:
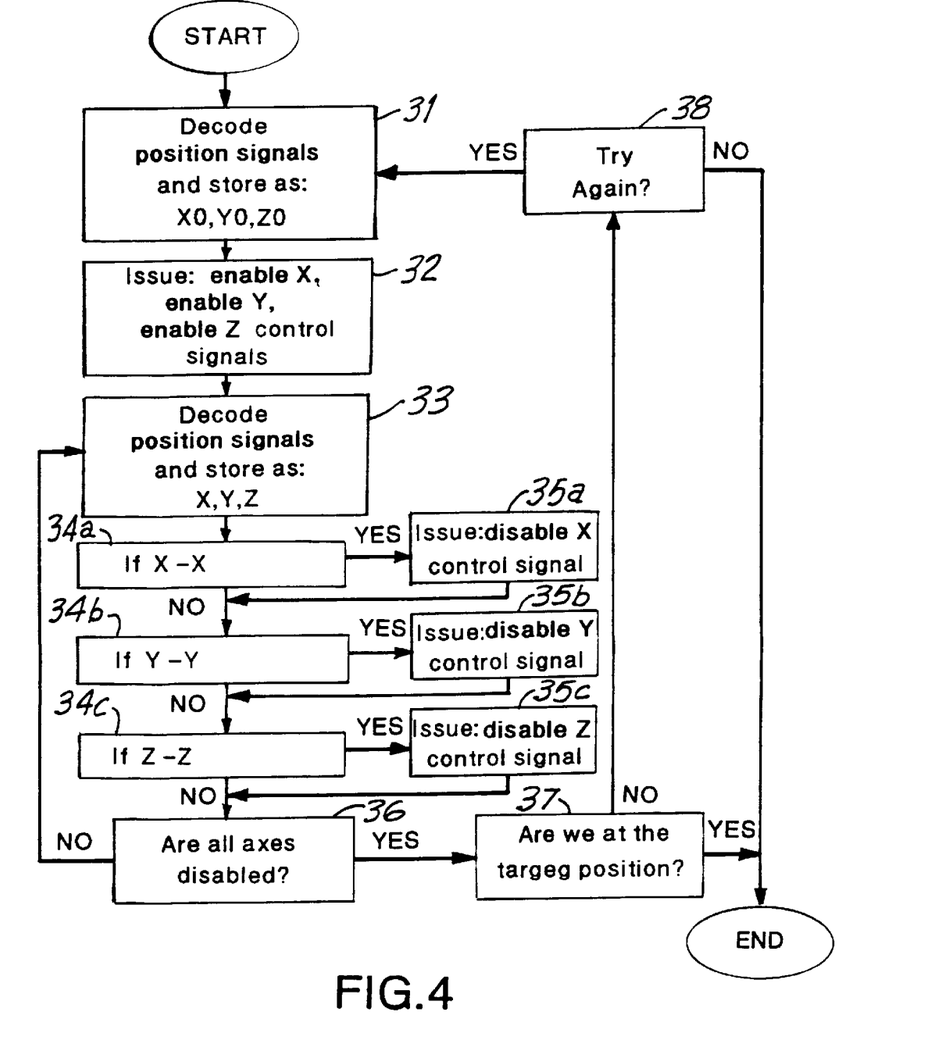
FIG. 4 is a flow chart illustrating a possible positioning operation for a manually operated milling machine supporting three computer controlled axes.

An understanding of the positioning operation may be obtained by referring to FIG. 1 and FIG. 4 and the description that follows. It is assumed that $X_T, Y_T, Z_T$ represent the coordinates of the target position of the tool 4 in FIG. 1; X0, Y0, Z0 represent the position of the tool at the start of the positioning cycle and X,Y,Z represent the most recently acquired tool position values. For this illustrative description the tool positioning tolerance for each axis is assumed to be the same and is represented by $\epsilon$. Control signals issued by the controller and identified as enable__X, enable__Y and enable__Z are used to signal each of the motion switch means (X, Y and Z) (8, 9 and 10 in FIG. 1) that motion along the corresponding axis is to be permitted. The control signals disable__X, disable__Y and disable__Z issued by the controller are used to signal each of the X,Y,Z motion switch means that motion along the corresponding axis is no longer permitted. Machine tool position feedback signals identified as position__signals are issued by the encoders and decoded by the controller. The present method and system to assist the manual machinist in achieving a positioning objective can best be understood using these definitions and the description that follows.

The machinist informs the controller 14 (in FIG. 1) that the machining objective is a positioning operation through menu selection, by pressing a designated key, switch closure or any other means of user input employed by computer systems. The control then proceeds to obtain the tool's target position ($X_T,Y_T,Z_T$) and the desired positioning tolerance $\epsilon$. With these positioning constraints loaded into the controller the computer assisted manual machining positioning operation may proceed.

At box 31, the starting position of the tool is decoded from the position_signals and stored as X0,Y0,Z0. The control then issues signals enabling motion of all the motion switch means as instructed in box 32. At box 33 the current tool position is decoded from the position_signals and stored as X, Y and Z.

Proceeding now to decision boxes 34a, 34b and 34c a sequence of tests will be performed for each controlled axis. The tests are identical, in terms of the conditions examined for each controlled axis, and are designated in the flow diagram using the sequence letters a, b and c for the X axis, Y axis and Z axis respectively. The explanation used for any one axis, X for example, holds true for the other controlled axes as well. Axis specific information in the description presented for X axis in the decision box 34a or 34b should be substituted by corresponding information for Y or Z axis in all boxes containing the same identifier but different sequence letter, i.e., 34b, 34c or 35b,35c.

At decision box 34a a test is performed to determine if enable_X control signal is still valid. The condition "$|X_T-X|$ less than $\epsilon$" checks to see if the tool's current X position is within the specified tolerance of the target position. Should this condition hold true, we move to box 35a and the controller issues a disable_X signal to X axis motion switch means 8 to prevent further motion of the tool along the X axis.

Regardless of the outcome of the tests at decision box 34a the control will eventually find itself at decision box 34b where a similar test is performed for the Y axis. Should the test condition hold true for the Y axis, control will proceed to box 35b signaling the Y axis motion switch means 9 to prevent further motion of that axis.

Eventually the control will find itself at decision box 34c where the Z axis test is performed and the control will, if the test condition is true, proceed to box 35c disabling the Z axis motion switch means 10 and then move on to decision box 36 or, upon failing the Z axis test in decision box 34c the control will proceed directly to decision box 36.

At decision box 36 a test is performed to see if all motion switch means are disabled. If one or more of the axes is still enabled, control returns to box 33 where the current position is updated and the tests for each controlled axes are repeated. If all the motion switch means have disabled further motion of the tool, the control verifies if the current tool position is indeed within the tolerance of the target position as is shown in decision box 37. Should the final tool position be outside of the desired tolerance, control moves to decision box 38 where control awaits further instruction from the machinist through menu selection, key press, switch closure or any other method to obtain information on whether another attempt at positioning is to be made. Upon receiving a signal indicating that another attempt is desired, the control moves to box 31 and another attempt is made. Should the machinist decide that another attempt is not desirable, the control exits the positioning mode. If at decision box 37 the controller determines that the tool is within the desired tolerance of the target position, the positioning operation has been successfully completed.

In addition to the positioning approach detailed in the preferred embodiment, which allows for motion of the tool as long as it is outside of the specified target position tolerance, alternate implementations exist. For positioning, the tests performed at decision blocks 34a, 34b and 34c can be replaced by alternate tests which would result in similar outcomes. The test at decision block 34a can be replaced by a test $(X_T-X)\times(X-X0)<0$ to allow X axis motion of the tool as long as its x position is between the start position and the target position. The use of the test $(X_T-X0)\times(X_T-X)\leq 0$ at decision block 34a would allow tool motion along the X axis provided it has not gone past the target position. Numerous test conditions exist. The use of multiple test conditions are also possible. For example, block 34a can be replaced by "$(X_T-X)\times(X-X0)<0$ or $|X_T-X|\leq\epsilon$," meaning that if either condition is true, control will proceed to block 35a.

Figure 5:
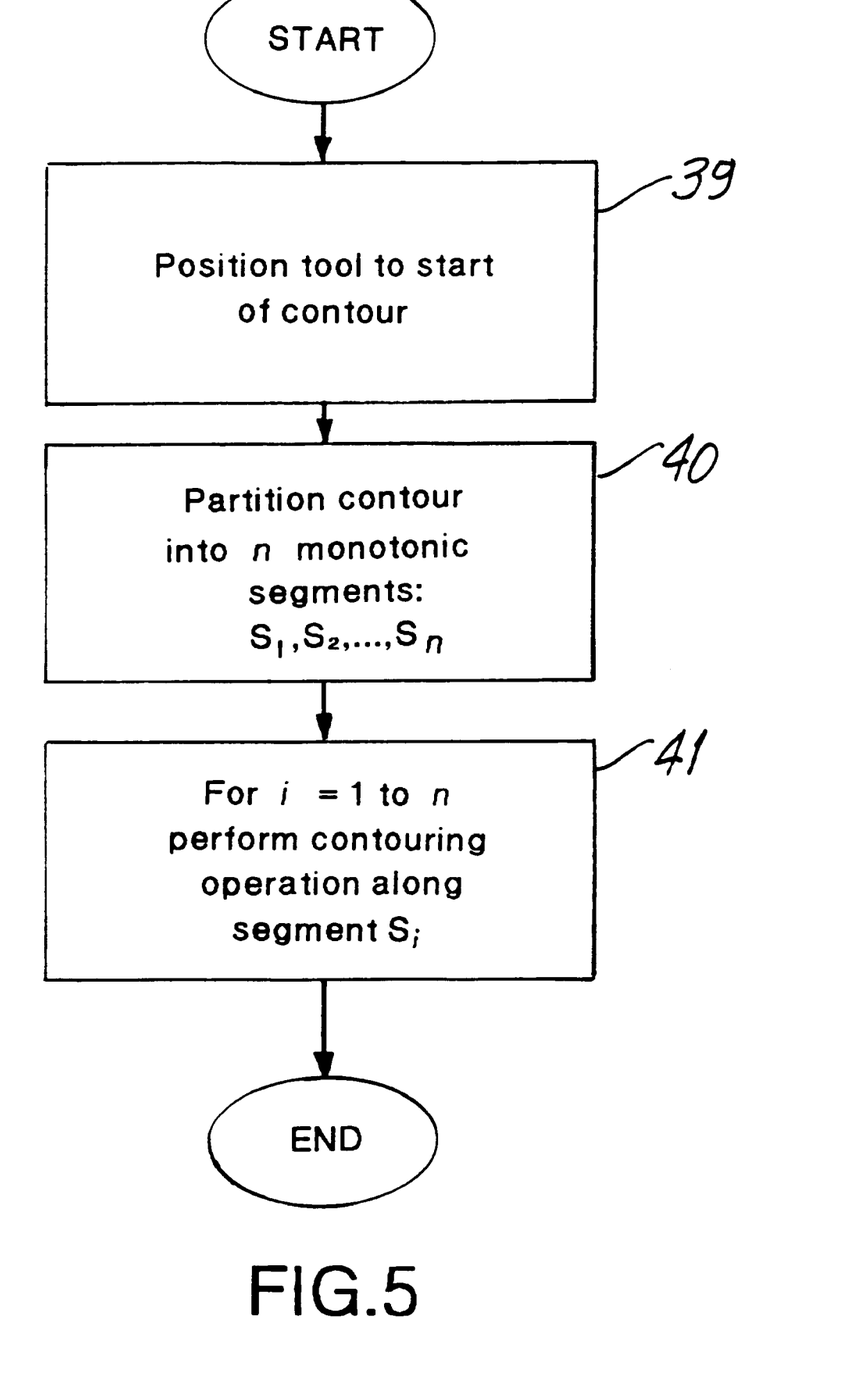
FIG. 5 is a flow chart illustrating a contouring operation for a manually operated milling machine supporting three computer controlled axes.
Figure 6:
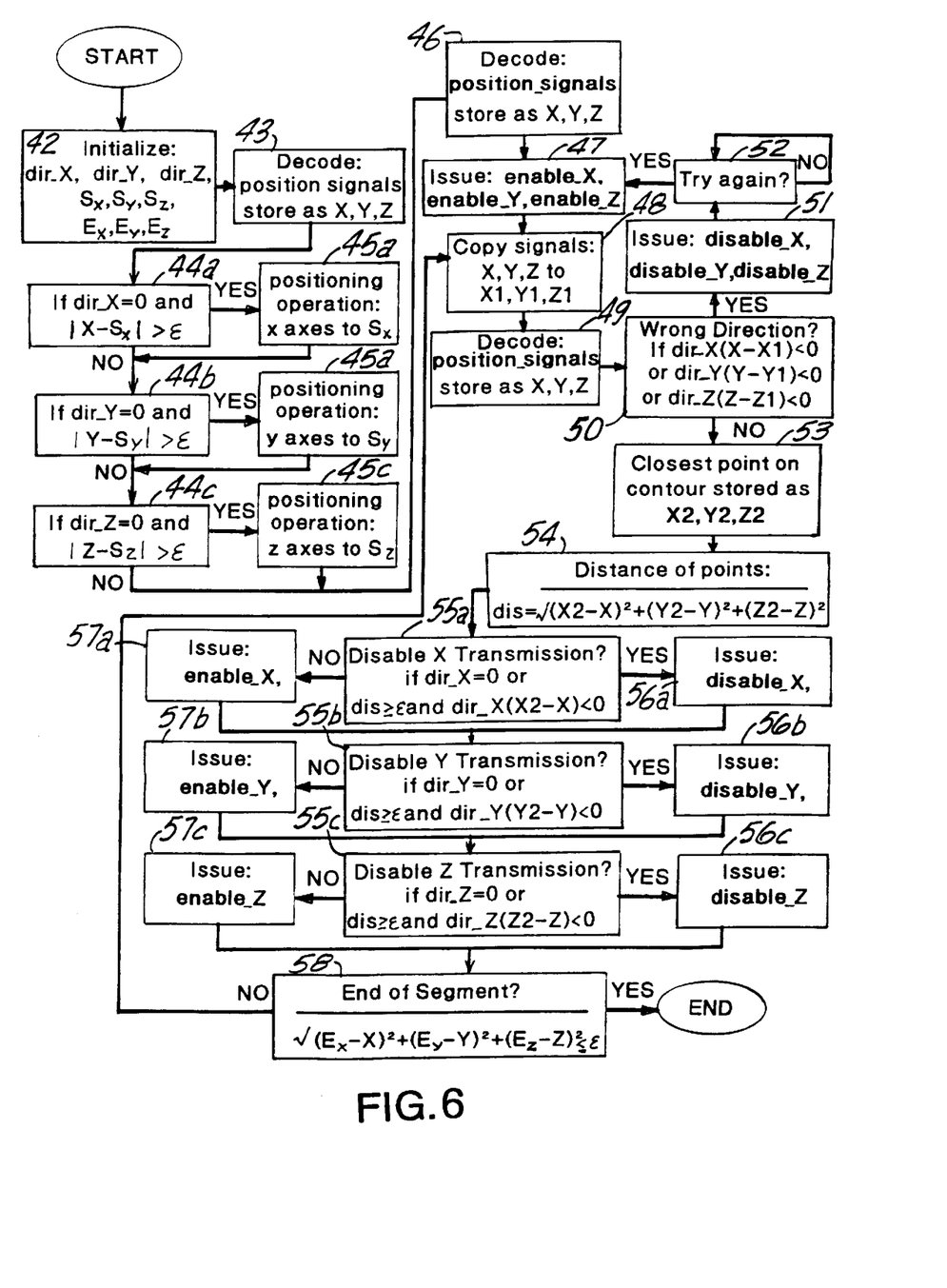
FIG. 6 is a detailed flow chart for contouring along a monotonic segment for a manually operated milling machine supporting three computer controlled axes.
Figure 7:
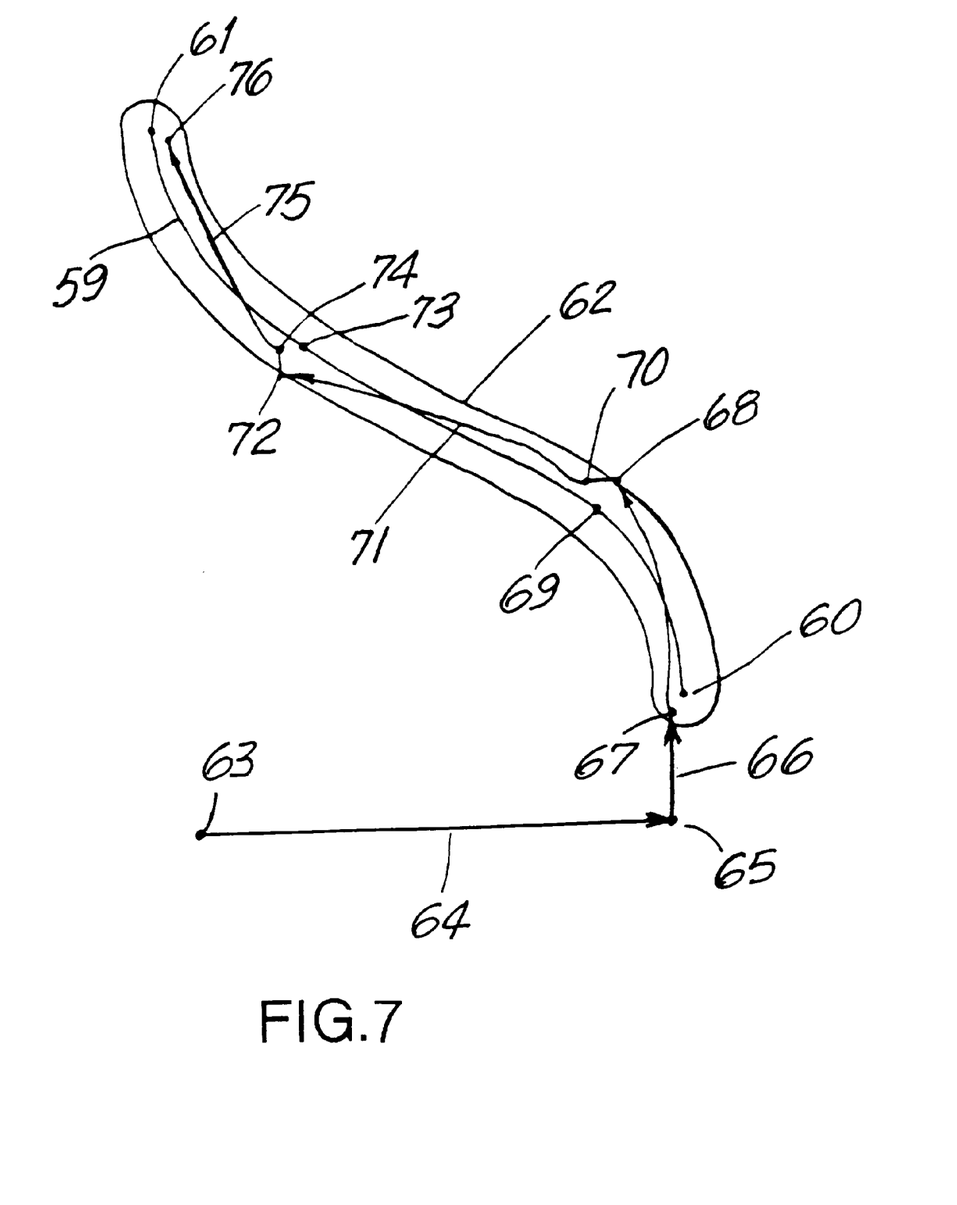
FIG. 7 illustrates a resultant trajectory for a two-dimensional contouring operation.

The contouring objective can be best understood by referring to FIG. 5 through FIG. 7. FIG. 5 represents a coarse or top level flow chart of steps that must be undertaken when contouring. FIG. 6 is a flow chart providing a detailed sequence of steps for contouring along a monotonic segment. FIG. 7 is an illustrative example of a possible trajectory using the methods described above. Prior to entering the detailed description of a contouring operation, several signals and their meaning must be established as well as a definition of a monotonic curve segment.

A curve is monotonic when a point moves from the starting point to the end point of the curve and each of its coordinates in the coordinate system changes in a monotonic fashion, i.e., increasing, decreasing or remaining a constant. All lines are monotonic segments. Curves are not necessarily monotonic but all curves in three-dimensional space may be represented by a series of monotonic segments. For example, a counterclockwise XY planer circle centered at (0,0) and beginning at (1,0) may be decomposed into 4 monotonic segments $S_1$ through $S_4$; $S_1$ is from 0° to 90° with decreasing X and increasing Y coordinates; $S_2$ is from 90° to 180° with decreasing X and Y coordinates; $S_3$ is from 180° to 270° with increasing X and decreasing Y coordinates; and $S_4$ is from 270° to 360° with increasing X and Y coordinates.

All contours or trajectories in three-dimensional space may be represented by a sequence of monotonic contour segments $S_1$ through $S_n$, where n is equal to the number of segments. Each monotonic segment can be characterized as having a particular segment direction. The direction of a monotonic contour segment may be established by traversing a point from the start to the end of the monotonic contour segment and observing how the coordinate values of the point change. As the point moves from the start to the end, each of the point's X,Y,Z coordinate values always increase, decrease or maintain a constant. The controller designates the monotonic segment direction by defining direction signals dir_X, dir_Y and dir_Z, for the X axis, Y axis and Z axis respectively, and setting the value of each direction signal according to the observation of the point's coordinate value for the corresponding axis. A +1 is used to indicate that the corresponding axis' coordinate is always increasing, a −1 is used to indicate that the axis' coordinate is always decreasing and an 0 is used to indicate that the axis' coordinate value is constant. The value of these three direction signals combined are representative of the monotonic contour segment's direction.

To move the tool along a monotonic contour segment the machinist must turn the appropriate hand wheels in the directions which are consistent with the monotonic contour segment's direction for each axis. Failure to manipulate a hand wheel in the appropriate direction will result in disabling motion for that axis. In addition, a tolerance zone, identifying the locus of points which are within a predetermined distance ϵ of each monotonic contour segment is established. Tool motion that deviates outside of this tolerance zone will not be permitted by the controller.

Referring now to FIG. 5, the contouring operation is initiated by moving the tool to the starting of the contour using the previously detailed positioning operation, as shown in box 39. The controller then breaks up the desired contour into monotonic segments as shown in box 40. Numerous procedures exist for accomplishing this task. One technique involves expressing the contour as a collection of parametric equations in t, i.e., $X_t=f(t)$; $Y_t=g(t)$ and $Z_t=h(t)$, and then finding all positions where the first derivative of either f(t), g(t) or h(t) equals zero. These positions are used to partition the contour into monotonic segments. Continuing to box 41 we see that a contouring operation is achieved by sequencing through a series of contouring operations for each monotonic segment.

Referring now to FIG. 6, a detailed description of contouring along a single monotonic contour segment will be presented. At box 42 the direction signals for this monotonic contour segment are determined and designated as dir_X, dir_Y and dir_Z. The start position of the monotonic contour segment are stored as $(S_x,S_y,S_z)$ and the end point for the segment is stored as $(E_x,E_y,E_z)$.

At box 43 the current position of the tool is acquired and designated as X, Y and Z. Proceeding now to decision box 44, a sequence of tests will be performed for each controlled axis. The tests are determined in terms of the conditions that are being examined and must be performed for each controlled axis. This is designated in the flow diagram using the sequence letters a, b and c to designate the X, Y and Z axes. The explanation used for any one axis, X for example, holds true for the other controlled axes as well. Axis specific information in the description presented for the X axis in decision box 44a or box 45a should be substituted by corresponding information for the Y axis or the Z axis in all boxes containing the same identifier but different sequence letters, i.e., 44b, 44c or 45b, 45c.

Referring now to box 44a, a test is made to determine if the value of dir_X is 0, meaning that the X coordinate of the current monotonic segment is a constant and if so, is the current X component of the tool position outside of the specified tolerance ϵ. Should this test hold true, it indicates that the X axis is not at the correct position and control moves to box 45a which implements the positioning operation detailed earlier in conjunction with FIG. 4, to assist the machinist in bringing the tool to the appropriate X starting position. Regardless of the outcome of the tests in decision box 44a the control will eventually find itself at decision boxes 44b and 44c where identical tests are performed for the Y and Z axes.

At box 46 position_signals are decoded and identified as X,Y,Z representing the current position of the tool. At this time, the tool is at an appropriate starting point for moving along this monotonic contouring segment. Thus, at box 47 motion switch means are signaled to enable motion. At box 48 the tool position X,Y,Z is duplicated and identified as X1, Y1, Z1 to be used as the last position value. At block 49 position_signals are again decoded and identified as X, Y and Z representing the new current position of the tool.

At decision block 50 a test is performed to verify if the current direction of tool motion, i.e., the machinist turning of the hand wheels, is consistent with maintaining this monotonic contour segment. This may be achieved by establishing the difference between the current tool position and the last tool position and then multiplying that value by the direction for that axis. The test at 50 is dir_X (X−X1) less than zero, represents the test condition for the X axis. The Y and Z axes are simultaneously tested with similar test conditions at 50. If the result is less than zero for any of the controlled axes then the test condition is true and control moves to box 51 where all motion switch means are signaled to disable motion. At this point the control moves to decision block 52 where the control awaits a signal from the machinist, generated by any method used by computer systems in acquiring user input, indicating that the machinist is prepared to attempt the contouring operation again. Upon receipt of this signal,control moves back to 47 where signals are sent enabling motion of the axes so the machinist may try again.

If, at a decision box 50, it is found that the manipulation of the hand wheels by the machinist is consistent with moving the tool along the current monotonic contour segment, control moves to box 53. At box 53 signals, representing the point on the current monotonic contour segment closest to the current tool position X,Y,Z, are established. This point on the monotonic contour segment is designated as X2, Y2, Z2. At box 54 the distance between the current tool position X,Y,Z and the closest point X2, Y2, Z2 are used to establish another signal, dis, representative of the distance between these two points.

A test is now required to determine the control signal to issue to each motion switch means, either enabling or disabling motion for the corresponding axis. Considering the X motion switch means first, two conditions exist that would result in the signaling of the X motion switch means to disable motion. The first condition is the case where dir_X equals 0 meaning that the X coordinate of the current monotonic contour segment is a constant. The second condition occurs when value of the disable signal is greater than or equal to the specified tolerance ϵ, and the product of dir_X and the difference between the closest point's X axis coordinate X2 and the tool's current X axis coordinate X is negative. Under all other circumstances the controller issues enable motion signals to the X motion switch means.

In the flow chart this test is shown in decision box 55a, with control moving to block 56a if the test condition is true, or moving to block 57a if the test condition is false. Regardless of the outcome of the test condition, the control will eventually find itself at decision box 55b where control signals are issued to the Y transmission and then decision box 55c where control signals are issued to the Z motion switch means.

Upon completion of the 55a, 55b, 55c tests used to determine what signals should be sent to each motion switch means,the control moves to decision block 58 where the distance of the tool to the end point of the contour segment is determined. If this distance is within the desired tolerance ϵ, movement along the current monotonic contour segment is completed. If the distance is greater than the requested tolerance the control moves to box 48 where this cycle is repeated until the end point is reached. A mathematical proof exists showing that if the machinist is turning the hand wheels in the direction consistent with that of the monotonic contour segment for each axis (dir_X, dir_Y, dir_Z), one axis will always be enabled. This proof guarantees that the machinist can always complete a contouring operation.

FIG. 7 is an illustrative example of an XY planar contouring operation that can be best understood by referring to FIG. 4, FIG. 5 and FIG. 6. It is desired to machine the contour 59, with starting point 60 (X0, Y0, Z0) and end point 61 (X', Y', Z') bounded by the tolerance zone 62. The tool is initially located at position designated as 63. Referring to FIG. 5 we see that box 39 instructs the control to enter positioning mode to move the tool to the starting point of the contour. The machinist turns the X axis hand wheel along illustrative path 64. Motion along this path proceeds until the control finds itself at decision box 34*a* of FIG. 4 with an X value for the current tool's position within the desired tolerance, disabling tool movement along the X axis at the position designated as 65. Since in the current positioning operation the Y and Z transmissions are still enabled, control in FIG. 4 returns to box 33 where positioning along the Y and Z axis may continue. The machinist continues moving the tool along Y axis following the path illustrated by line 66 until the motion of the Y axis is disabled. Finally, by turning the Z axis hand wheel to drive the tool down, into and normal to the page at point 67 of FIG. 7, the tool is positioned at the location designated as 67, a valid starting point of the current contouring operation inside the tolerance zone 62.

Referring again to FIG. 5, with the positioning operation completed, control proceeds to box 40 where the control partitions the contour into monotonic contouring segments. In this example only one monotonic segment exists, the contour 59 of FIG. 7. Control therefore proceeds to box 41 where the contour is machined by stepping through each monotonic contour segment. In our example, only one segment exists.

Referring to FIG. 6, initial values are assigned to several important signals, namely, dir_X=−1, dir_Y=+1, dir_Z=0, $S_x$=X0, $S_y$=Y0, $S_z$=Z0, $E_x$=X', $E_y$=Y' and $E_z$=Z' at box 42. This implies that X coordinates are decreasing throughout the segment, the Y coordinates are increasing throughout the segment and the Z values remain a constant $S_z$ equal to Z0. Since the tool has already been positioned at a valid starting point the tests at decision boxes 44*a*,44*b* and 44*c* fail. Control proceeds to box 46 where the current position is obtained and then at box 47 all the axes are enabled so that contouring may commence.

If at this moment the machinist should incorrectly rotate the X axis hand wheel, the controller will detect this incorrect movement at decision box 50 and disable tool movement along all of the axes at box 51. The machinist must then acknowledge his error and signal the control that another attempt at contouring this segment is to be made, as shown in decision box 52. Upon receiving this signal the control will restart at box 47 of FIG. 6.

At this time we assume the machinist will turn the hand wheels in a direction consistent with the monotonic contour segment until all three motion switch means are signaled to disable further motion of the tool. Referring to FIG. 6 and FIG. 7, the illustrative trajectory connecting the tool's start point 67 to intermediate point 68 is representative of a trajectory segment that might be followed by the tool. During this movement the 55*a*, 55*b*, 55*c* decision boxes in FIG. 6 would signal that the X and Y motion switch means are to be enabled to permit motion of the tool along those axes and the Z transmission would be signaled to disable further motion of the tool along the Z axis. Upon reaching the intermediate point 68 the tool would be at the edge of the tolerance zone 62. The closest point to the tool on this contour segment, point 69, would have been computed in box of FIG. 6 with coordinates (X2, Y2, Z2). At box 54, the control would have computed the distance of the tool to point 69. At tests 55*a*, 55*b* and 55*c* in FIG. 6 the controller will find that dir_X=−1, dir_Y=1, and dir_Z=0, dis≧ε, dir_X (X2−X)>0, dir_Y (Y2−Y)<0, and therefore would issue signals to disable Y and Z motions, resulting in the movement of the tool to intermediate point 70. Since point 70 is located within the tolerance zone 62 both X and Y axis motion switch means would be signaled to enable tool motion as a result of the tests performed by the 55*a*, 55*b*, 55*c* decision boxes.

Tool motion proceeds along the illustrative trajectory 71 until intermediate point 72 is encountered. At this point in time the closest point 73 on the contour to the tool has been computed at block 53 and the dis signal is assigned a value representative of the distance between these two points at box 54. The tests at decision boxes 55*a* and 55*c* result in signals to the X and Z motion switch means disabling further motion along those axes while a signal enabling motion along the Y axis is issued to the Y motion switch means as a result of the 55*b* tests. Tool motion thus proceeds along the illustrative trajectory connecting intermediate points 72 and 74. When the tool is at point 74 the tests at decision boxes 55*a* and 55*b* indicate that both the X and Y motion switch means should be signaled to enable motion and the Z axis is to be disabled as a result of the test at 55*c*.

Motion of the tool proceeds along the illustrative trajectory 75 until point 76 is reached. At this point the test at decision box 58 indicates that the tool is within the tolerance of this monotonic contour segment's end point 61 signaling the end of the contouring operation for this monotonic segment and control returns to box 41 of FIG. 5 which indicates that the next monotonic contour segment in the sequence should be machined. In this illustrative example only one monotonic segment existed and thus the contouring operation has been successfully completed.

Figure 8:
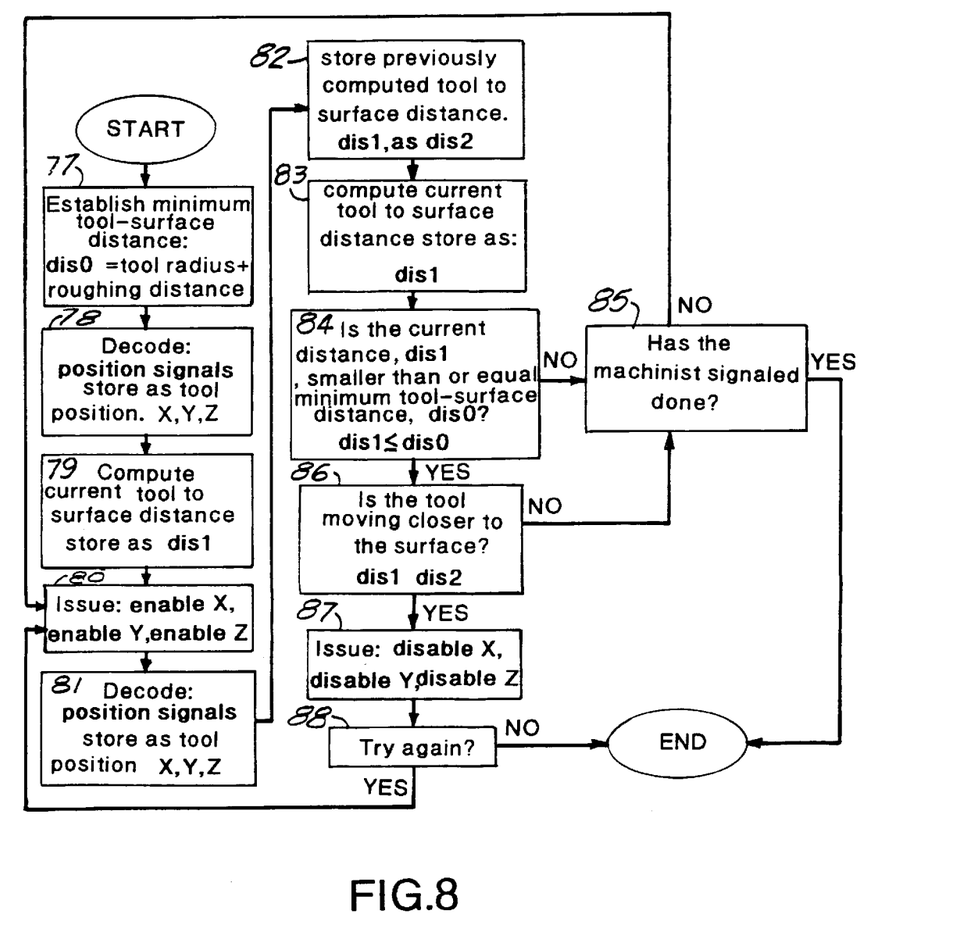
FIG. 8 is a flow chart illustrating a pocketing operation for a manually operated milling machine supporting three computer controlled axes.

The flow chart of FIG. 8 details the operation of a controller designed to assist the machinist achieving the pocketing objective. A pocket may be defined as the space bounded by a set of boundary surfaces. Pocketing of components is often completed in two steps, the first being a roughing step used to remove bulk material from around the boundary surfaces. Tools capable of quickly removing large volumes of materials are used in this step. To prevent damage to the final surfaces, the tool is often kept a known distance away from the boundary surfaces. This distance is often referred to as the roughing surface. A second pass, sometimes with a different tool and slower feeds, is used to machine the workpiece to its final shape and dimension in what is termed a finishing pass. Frequently, the finishing pass is achieved using a contouring operation with the tool sliding along the boundary surface of the part. The details associated with pocketing can best be understood using the description that follows in conjunction with FIG. 8.

At box 77 the signal dis0, the minimum allowable approach distance, is established to be representative of the sum of the tool's radius and the roughing distance. At box 78 position_signals identifying the current position X, Y and Z of the tool are established. At box 79 the distance of the tool to the closest pocket boundary surface is computed. This value is assigned to the signal dis1. At control box 80 the transmissions for all controlled axes are signaled to enable motion. At box 81 new position_signals reporting the current position of the tool are assigned to X,Y,Z. The control then moves to box 82 where previous value of the signal identified as dis1 is copied to a new signal dis2. At box 83 a new value for dis1, the current distance of the tool to the closest pocket boundary surface, is established using new position values obtained in control box 81.

At decision box 84 a test is made to determine if the value of the signal representing the shortest distance of the tool to the closest boundary surface, dis1, is less than or equal to the minimum allowable approach distance disO. If this test fails, indicating that the tool is not about to violate a part surface, control moves to decision box 85 where the controller checks to see if the machinist has signaled that the current machining operation is done. Signaling by the machinist is achieved by menu selection, key press, switch closure or any other method used by computer systems to obtain user input. If the machinist has signaled that the operation is done, control terminates. If this signal is not detected, control proceeds to box 80 where the aforementioned cycle is repeated.

If, at decision box 84, the test indicates that the tool is at or within the minimum tool surface distance, control would move to decision box 86. At decision box 86 a test is done to see if the current distance represented by dis1 is less than the previously computed distance represented by dis2. If this test fails, indicating that the tool is moving away from the surface, control proceeds to decision box 85 which tests to see if the machinist has indicated that the pocketing operation is done. If the machinist signals that the operation is completed, the control exits the current machining operation, otherwise control proceeds to box 80 where this cycle is repeated.

If at decision box 86 the test indicated that the tool is moving closer to the surface, i.e., the machinist is making an error, control moves to box 87 where signals are issued to all the axes indicating that motion of the tool is to be disabled. Control then proceeds to decision box 88 where the control awaits a signal from the machinist acknowledging the erroneous action and the desire to attempt the pocketing operation again. Upon receipt of this signal from the machinist generated by any means used by computer systems for acquiring user input control moves to box 80 enabling motion for all axes and this cycle is completed. If the machinist decides that another attempt at pocketing is not desired, the system terminates the pocketing operation.

All mathematics mentioned in the disclosure, such as methods of representing pockets by their boundary surfaces, representing a curve or a surface model, the computation of distance from a point to a point, a curve or a part surface, the closest point on a curve or a surface, the method of partitioning a curve into monotonic segments, are in the public domain.

Other variations within the scope of the invention will also be apparent to one skilled in the art, it being understood that the scope of the invention will be defined in the claims which follow.

What is claimed is:

1.
- (a) A manual machine tool system having relative motion of a tool;
- (b) first moving means including a hand wheel and a hand wheel drive system connected to the tool and the hand wheel, the hand wheel when manually rotated actuating the hand wheel drive system to move the tool along a first axis;
- (c) first sensor means to detect the position of the tool along the first axis and to generate a first axis tool location signal;
- (d) second moving means to move the tool along a second axis which is different from the first axis;
- (e) second sensor means to detect location of the tool along the second axis and to generate a second axis tool location signal;
- (f) a computer based controller to accept machining objectives defining a region in which motion of the tool is prohibited and the tool location signals and to generate therefrom a control signal to disable relative tool motion along at least one axis when a tool location signal indicates that the tool is within the defined region;

characterized in that the machine tool further comprises:
- (g) a first electrically controlled motion switch means physically connected to the hand wheel drive system to engage or disengage the hand wheel drive system's connection to the tool and to thereby start or stop the tool's movement along the first axis on receipt of said control signal; and
- (h) a second electrically controlled motion switch means connected to the second moving means to engage or disengage movement of the tool along the second axis on receipt of said control signal.

2. A machine tool system as in claim 1 wherein the motion switch means comprises an electromechanical switch which physically engages or disengages the hand wheel drive system's connection to the tool.

3. A machine tool system as in claim 1 wherein the motion switch means comprises an electronically controlled clutch means to engage and disengage relative tool motion.

4. A machine tool system as in claim 1 wherein the motion switch means comprises an electronically controlled brake.

5. A machine tool system as in claim 1 wherein the tool system includes a workpiece holding table and the first axis is the X axis and the second axis is the Y axis of the table.

6. A machine tool method comprising the steps of providing:
- (a) A manual machine tool system having relative tool motion of a tool;
- (b) first moving means including a hand wheel and a hand wheel drive system connected to the tool and the hand wheel, the hand wheel when manually rotated actuating the hand wheel drive system to move the tool along a first axis;
- (c) first sensor means to detect the position of the tool along the first axis and to generate a first axis tool location signal;
- (d) second moving means to move the tool along a second axis which is different from the first axis;
- (e) second sensor means to detect location of the tool along the second axis and to generate a second axis tool location signal;
- (f) a computer based controller to accept machining objectives defining a region in which motion of the tool is prohibited and the tool location signals and to generate therefrom a control signal to disable relative tool motion along at least one axis when a tool location signal indicates that the tool is within the defined region;

characterized in that the machine tool method further comprises:
- (g) electrically controlling a motion switch means physically connected to the hand wheel drive system to engage or disengage the hand wheel drive system's connection to the tool and to thereby start or stop the movement of the tool along the first axis on receipt of said control signal; and
- (h) electronically controlling a motion switch means connected to the second moving means and thereby engaging or disengaging movement of the tool along the second axis on receipt of said control signal.

7. A machine tool system as in claim 1 wherein at least one of the moving means comprises a motor.

8. A machine tool system as in claim 1 wherein the sensor means is an electromechanical transducer selected from the group of a linear encoder and a rotary encoder.

9. A machine tool system as in claim 1 wherein the machine tool system comprises a manual 3-axis milling machine having a quill and a workpiece holding table and the machine tool system further comprises:

(i) a third moving means to move the quill along the Z-axis and generate quill location signals; and (j) third sensor means to detect the location of the quill along the Z-axis and generate quill location signals; and (k) a third electronically controlled motion switch means device connected to the third moving means to engage or disengage movement of the quill along the Z-axis on receipt of said control signal.

10. A machine tool system as in claim 1 wherein in (f) a machining objective is a contouring objective having a boundary of permissible motion, all other areas defining a region in which relative tool motion is prohibited, and including means within the controller to generate control signals to at least one of the motion switch means of (g) or (h) to disengage relative tool motion along at least one axis when the tool is within the boundary.

11. A machine tool system as in claim 1 wherein in (f) a machining objective is a contouring objective having a boundary of permissible motion includes a desired direction of movement, all other areas defining a region in which motion is prohibited, and means to control the motion switch means of at least one of (g) or (h) so that at least one moving means is enabled when the tool is not within the boundary in which motion is prohibited.

12. A machine tool system as in claim 1 wherein in (f) a machining objective is a positioning objective having a desired target region and including means within the controller to generate control signals to the motion switch means of at least one of (g) or (h) to disengage motion along at least one axis when the tool is within the target region.

13. A machine tool system as in claim 1 wherein in (f) a machining objective is a pocketing objective specifying the boundary of regions in which motion is not permitted, said regions being offset from the boundary of the desired shape by a predetermined distance and means in (f) to disable at least one moving means when the tool is within a region in which motion is prohibited.

14. A machine tool method as in claim 6 wherein in (f) a machining objective is a pocketing objective specifying the boundary of regions in which motion is not permitted, said regions being offset from the boundary of the desired shape by a predetermined distance and using (f) disabling at least one moving means when the tool is within a boundary region in which motion is prohibited.

15. A machine tool method as in claim 6 wherein the motion switch means comprises an electromechanical clutch and the electrical controlling of at least one of (g) or (h) engages or disengages relative tool motion by the clutch.

16. A machine tool method as in claim 6 and in (g) and (h) electronically controlling clutch means to engage and disengage relative tool motion.

17. A machine tool method as in claim 6 wherein the motion switch means comprises an electronically controlled brake and the controlling of (g) and (h) to engage or disengage relative tool motion by the brake.

18. A machine tool method as in claim 6 wherein the tool system includes a workpiece holding table and the first axis is the X and the second axis is the Y axis of the table and moving the table along at least one of the X or Y axis.

19. A machine tool method as in claim 6 wherein in (f) a machining objective is a positioning objective having a desired target region and having the controller generate control signals to the motion switch means of at least one of (g) or (h) to disengage motion along at least one axis when the tool is within the target region.

20. A machine tool method as in claim 6 wherein the second moving means comprises a motor and operating the motor to move the tool along an axis.

21. A machine tool method as in claim 6 and sensing the tool location using an electromechanical transducer as the sensor means selected from the group of a linear encoder and a rotary encoder.

22. A machine tool method as in claim 6 wherein the machine tool comprises a manual 3-axis milling machine having a quill and a workpiece holding table and the machine tool system further comprises:

(i) a third moving means to move the quill to various locations along a Z-axis;

(j) third sensor means to detect the location of the quill along the Z-axis and generate quill location signals; and electrically controlling a motion switch means device connected to the third moving means and thereby engaging or disengaging movement of the quill along the Z-axis on receipt of said control signal.

23. A machine tool method as in claim 6 wherein in (f) a machining objective is a contouring objective having a boundary region of permissible motion, all other areas defining a region in which relative tool motion is prohibited, and including means within the controller to generate control signals to the motion switch means of at least one of (g) or (h) to disengaging relative tool motion along at least one axis when the tool is within the region.

24. A machine tool method as in claim 6 wherein in (f) a machining objective is a contouring objective having a boundary region of permissible motion includes a desired direction of movement, all other areas defining a region in which motion is prohibited, and controlling the motion switch means of (g) and (h) so that at least one moving means is enabled when the tool is not in the boundary region in which motion is prohibited.

* * * * *